(No Model.)
J. W. SHRYOCK,
Cylinder Car.
No. 230,899.          Patented Aug. 10, 1880.
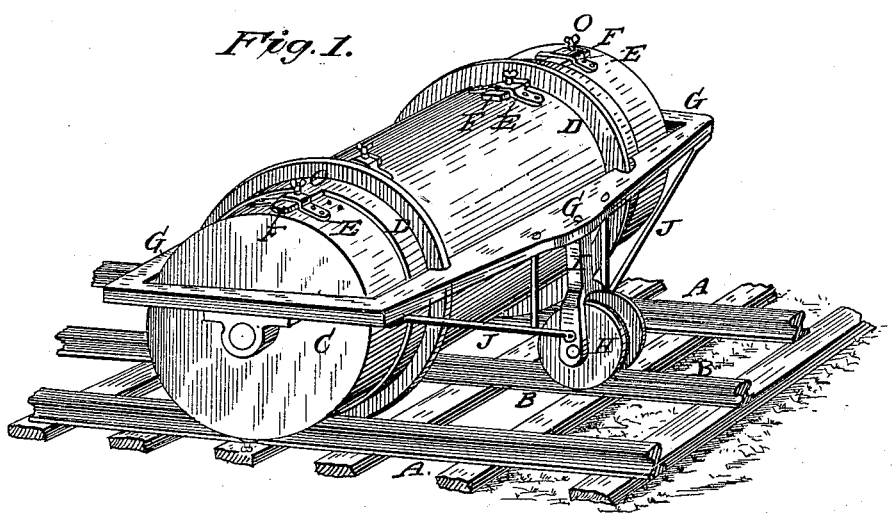
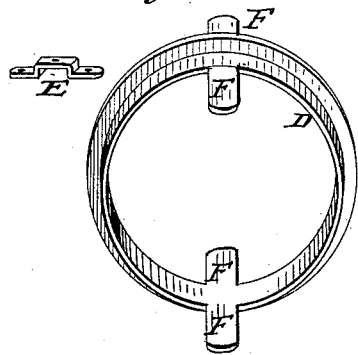
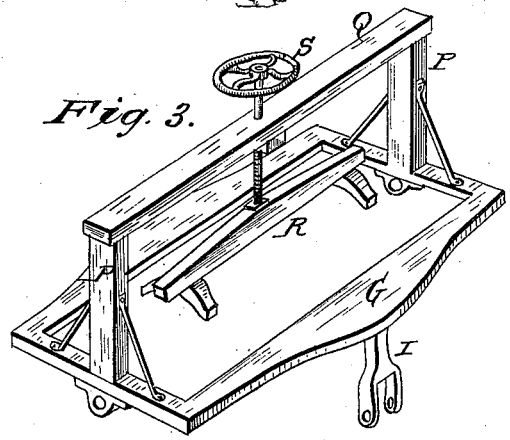
Witnesses:
Fred G. Ditterich
W. Littell,
Inventor:
James W. Shryock
By C. A. Snow & Co.,
Attorneys.
N. PETERS, PHOTO-LITHOGRAPHER, WASHINGTON, D. C.

UNITED STATES PATENT OFFICE.

JAMES W. SHRYOCK, OF EL MORO, COLORADO.

CYLINDER-CAR.

SPECIFICATION forming part of Letters Patent No. 230,899, dated August 10, 1880.

Application filed May 11, 1880. (No model.)

*To all whom it may concern:*

Be it known that I, J. W. SHRYOCK, of El Moro, in the county of Las Animas and State of Colorado, have invented certain new and useful Improvements in Cylinder-Cars; and I do hereby declare that the following is a full, clear, and exact description of the invention, which will enable others skilled in the art to which it appertains to make and use the same, reference being had to the accompanying drawings, which form a part of this specification.

Figure 1 is a view, in perspective, of a cylinder-car embodying the improvements in my invention in position on a triple-rail track. Fig. 2 is a detail view of one of the steel tires and one of the staples by which it is secured to the cylinder; and Fig. 3 is a perspective detail of the frame and brake.

This invention relates to that class of cars intended to be used in mountainous districts for transporting ores from the mines to the smelters and mills, and more especially to cars adapted for use on triple-rail tracks; and it consists in the improvements in the construction of the same hereinafter fully described and particularly pointed out in the claims.

Referring by letter to the drawings, A A designate the side rails, and B the central rail, of a triple-track narrow-gage railway.

C designates an iron cylinder or car provided with flanged steel tires D D intermediate of its ends. The said tires D are adjustably secured to the cylinder C by means of straps or staples E, which embrace arms F, extending from each side of the steel tires C, so that the tires which form the wheels of the car may be adjusted to adapt the car for use on gages of different widths.

G designates the frame, in which the cylinder or car C is journaled at its ends, as shown, and H designates a central wheel—one at the front and one at the rear—having flanges to embrace the rail B. These wheels are journaled in posts I, connected to the frame G, and supported by rods or braces J, extending from end to end of the frame, or in any other suitable manner.

The wheels H, running on the central rail, serve as guides for the car, and by lubricating the rail B at the curves in the track the friction will be greatly reduced. These wheels, being placed at the middle line of the load, give considerable leverage at the curves, which helps to reduce the friction in proportion to the distance of said wheels from the load, while applying the lubricant to the rail B does not interfere with the traction of the outside wheels. Besides, in this form of car large wheels are provided and the load rests directly upon the track.

Arms F extend from the tires D and are embraced by staples E, secured to the cylinder C by bolts or otherwise, and set-screws O are employed to hold the arms in place when they are adjusted to suit gages of different widths.

Standards P rise from the frame G, and are braced and connected by a cross-bar, Q.

A brake, R, rests upon the cylinder C, and is operated by a shaft and hand-wheel S, to check the speed of the car when necessary.

Having thus fully described my invention, what I claim, and desire to secure by Letters Patent, is—

1. In a car for transporting ores and the like, the combination of the cylinder C, provided with the wheels or tires D, with the frame G and the flanged guide-wheels H, substantially as and for the purposes set forth.

2. In a car for transporting ores and the like, the combination of the cylinder or car C, journaled in the frame G, provided with the double-flanged wheels H, with the adjustable flanged steel tires D, substantially as and for the purposes set forth.

3. In a cylinder-car, the combination of the frame G and guide-wheels H, with the cylinder C, tires D, and guide-wheels H supported in the frame G, substantially as and for the purposes set forth.

4. In a cylinder-car, the combination, with the cylinder C, of the steel tires D, provided with arms F, the staples E, and set-screws O, substantially as and for the purposes set forth.

In testimony that I claim the foregoing as my own I have hereto affixed my signature in presence of two witnesses.

JAMES WILLARD SHRYOCK.

Witnesses:
JOHN W. WIDDERFIELD,
HENRY T. O'FARRELL.